(12) United States Patent
Reinhold (10) Patent No.: US 11,724,238 B2
(45) Date of Patent: Aug. 15, 2023

(54) LABORATORY DEVICE WITH ADJUSTABLE OPERATING PARAMETERS FOR CONTROLLING A LABORATORY DEVICE FUNCTION

(71) Applicant: Hans Heidolph GmbH, Kelheim (DE)

(72) Inventor: Stefan Reinhold, Nuremberg (DE)

(73) Assignee: Hans Heidolph GmbH, Kelheim (DE)

( * ) Notice: Subject to any disclaimer, the term of this patent is extended or adjusted under 35 U.S.C. 154(b) by 91 days.

(21) Appl. No.: 16/646,222

(22) PCT Filed: Sep. 14, 2018

(86) PCT No.: PCT/EP2018/074926
§ 371 (c)(1),
(2) Date: Mar. 11, 2020

(87) PCT Pub. No.: WO2019/053208
PCT Pub. Date: Mar. 21, 2019

(65) Prior Publication Data
US 2020/0276545 A1    Sep. 3, 2020

(30) Foreign Application Priority Data
Sep. 15, 2017  (DE) ............... 20 2017 004 815.9

(51) Int. Cl.
*B01F 13/08*   (2006.01)
*B01F 7/00*    (2006.01)
(Continued)

(52) U.S. Cl.
CPC .......... *B01F 33/452* (2022.01); *B01F 33/813* (2022.01); *B01F 35/2209* (2022.01);
(Continued)

(58) Field of Classification Search
CPC ............... B01F 13/1022; B01F 33/45; G01N 2035/00326; G01N 2035/00881;
(Continued)

(56) References Cited

U.S. PATENT DOCUMENTS

| 4,080,663 A | 3/1978 | Wik |
| 4,225,248 A | 9/1980 | Para |

(Continued)

FOREIGN PATENT DOCUMENTS

| CN | 102143799 A | 8/2011 |
| CN | 103338888 A | 10/2013 |

(Continued)

OTHER PUBLICATIONS

Translation of Hua Qiuping (CN 205850744), published Jan. 2017. Translation retrieved Nov. 2021. (Year: 2017).*

(Continued)

*Primary Examiner* — Elizabeth Insler
(74) *Attorney, Agent, or Firm* — Locke Lord LLP; Scott D. Wofsy; Michael J. Pollack (57) ABSTRACT

A laboratory device (4, 9), in particular a magnetic stirrer, comprises at least one adjustable operating parameter for controlling at least one laboratory device function, and an outer housing (2). The outer housing (2) has a coupling device (11*a*, 11*b*) for coupling the laboratory device (4, 9) to at least one further laboratory device (5, 9) for the same at least one laboratory device function, at which further laboratory device the at least one operating parameter can also be adjusted, and the coupling device (11*a*, 11*b*) is configured such that by means of the coupling device (11*a*, 11*b*) the laboratory device (4, 9) and the at least one further laboratory device (5, 9) can be operated simultaneously and by means of a common adjustment device the at least one operating parameter can be adjusted in a central manner (Continued)

independently and/or consistently for the laboratory device (4, 9) and the at least one further laboratory device (5, 9).

28 Claims, 3 Drawing Sheets

(51) Int. Cl.

| | | |
|---|---|---|
| *B01F 13/10* | (2006.01) | |
| *B01F 15/00* | (2006.01) | |
| *B01F 15/06* | (2006.01) | |
| *G05B 19/042* | (2006.01) | |
| *B01F 33/452* | (2022.01) | |
| *B01L 7/00* | (2006.01) | |
| *B01F 33/81* | (2022.01) | |
| *B01F 35/93* | (2022.01) | |
| *B01F 35/22* | (2022.01) | |
| *B01F 35/90* | (2022.01) | |
| *B01F 101/23* | (2022.01) | |

(52) U.S. Cl.
CPC ............. *B01F 35/93* (2022.01); *B01L 7/00* (2013.01); *G05B 19/042* (2013.01); *B01F 2035/99* (2022.01); *B01F 2101/23* (2022.01); *G05B 2219/23389* (2013.01); *G05B 2219/25314* (2013.01)

(58) Field of Classification Search
CPC .......... G05B 2219/25314; H01R 13/02; H01R 13/623; Y10S 439/928
See application file for complete search history.

(56) References Cited

U.S. PATENT DOCUMENTS

| | | | | |
|---|---|---|---|---|
| 5,428,470 A | * | 6/1995 | Labriola, II | ..... G01N 35/00584 |
| | | | | 398/171 |
| 5,834,739 A | * | 11/1998 | Lockwood | ............ A47J 27/004 |
| | | | | 219/468.1 |
| 7,413,714 B1 | | 8/2008 | Schwalbe et al. | |
| 2005/0159982 A1 | | 7/2005 | Showalter et al. | |
| 2014/0368069 A1 | * | 12/2014 | Ren | ...................... H01R 13/623 |
| | | | | 439/337 |

FOREIGN PATENT DOCUMENTS

| | | | | |
|---|---|---|---|---|
| CN | 103701882 A | | 4/2014 | |
| CN | 104415696 A | | 3/2015 | |
| CN | 204952799 U | | 1/2016 | |
| CN | 106056883 A | | 10/2016 | |
| CN | 205850744 U | * | 1/2017 | |
| CN | 205850744 U | | 1/2017 | |
| CN | 106458196 A | | 2/2017 | |
| CN | 106582414 A | | 4/2017 | |
| DE | 28 30 548 A1 | | 2/1979 | |
| DE | 10 2006 005 155 B3 | | 8/2007 | |
| DE | 102011111581 A1 | | 2/2013 | |
| EP | 2083339 A1 | | 7/2009 | |

OTHER PUBLICATIONS

Chemical Synthesis in Microreactors, CHIMIA International Journal for Chemistry, vol. 56 (2002), No. 11, p. 636-646.
International Search Report issued in PCT/EP2018/074926, dated Dec. 21, 2018.
Catalogue on Magnetic Stirrers; 2Mag Ag; (2012-2013).

* cited by examiner

LABORATORY DEVICE WITH ADJUSTABLE OPERATING PARAMETERS FOR CONTROLLING A LABORATORY DEVICE FUNCTION

CROSS REFERENCE TO RELATED APPLICATIONS

This application is a U.S. National Phase Application filed under 35 U.S.C. § 371, based on International PCT Patent Application No. PCT/EP2018/074926, filed Sep. 14, 2018 which application claims priority to German Patent Application No. 20 2017 004 815.9 filed on Sep. 15, 2017. The entire contents of these applications is incorporated herein by reference in their entirety.

The present invention relates to a laboratory device, in particular a magnetic stirrer, with at least one adjustable operating parameter for controlling at least one laboratory device function.

Such a laboratory device is, for example, a magnetic stirrer, which comprises a placement plate and a magnetic drive arranged in the housing of the laboratory device. The magnetic drive is configured to generate a suitable magnetic field, typically changing in time, in order to set a stirrer into a stirring motion, which stirrer is within a vessel standing on the placement plate. The placement plate can in particular represent a heating plate in order to warm up or heat a substance in the vessel.

Such a magnetic stirrer is known for example from DE 10 2006 005 155 B3. For controlling its stirring and/or heating function, associated operating parameters, such as a heating plate temperature or a stirring strength, can be adjusted by means of a user interface arranged on a front of the housing and having a display, a plurality of control knobs and a turning controller.

With several magnetic stirrers of this type it is also possible to stir and/or heat several vessels at the same time. The respective operating parameters must then be adjusted at each magnetic stirrer separately from the other magnetic stirrers.

It is an object of the present invention to provide an alternative or improved laboratory device with at least one adjustable operating parameter for controlling at least one laboratory device function and a corresponding laboratory devices set of similar laboratory devices, by means of which the production of the devices and/or their operation and/or their control can be simplified or improved in the case that several laboratory devices of the same type are used simultaneously.

This object is achieved by a laboratory device according to claim 1, a control unit according to claim 14, a set of laboratory devices according to claim 16 and a retrofit kit according to claim 20. Further developments of the invention are specified in the dependent claims. All the further features and effects described in the claims and the description for the mentioned laboratory device also apply analogously to the control unit, the set of laboratory devices and the retrofit kit, and vice versa.

According to a first aspect of the invention, a laboratory device with at least one adjustable operating parameter for controlling at least one laboratory device function is provided, which laboratory device can represent in particular a magnetic stirrer. The laboratory device according to the invention has an outer housing that comprises a coupling device for coupling the laboratory device according to the invention to at least one further laboratory device for the same at least one laboratory device function, at which further laboratory device the at least one operating parameter can also be adjusted. The coupling device is configured such that by means of the coupling device the laboratory device according to the invention and the at least one further laboratory device can be operated simultaneously and that by means of a common adjustment device the at least one operating parameter can be adjusted in a central manner independently and/or consistently for the laboratory device according to the invention and the at least one further laboratory device.

Thus, in terms of their laboratory device functions, the further laboratory device or devices mentioned represent laboratory devices of the same type as the laboratory device according to the invention; apart from that they can but do not have to be designed identically to it or to one another. The aforementioned centralized operation and/or control of the coupled laboratory devices by centrally adjusting of their operating parameters by means of the common adjustment device can be implemented, for example, via the laboratory device according to the invention or one of the further laboratory devices or alternatively via a computer or another external control device. Various specific examples of this are described below, in particular with reference to the set of laboratory devices according to the invention.

By means of the mentioned coupling and the centralized operation and/or control of several laboratory devices of the same type, a single laboratory device can be expanded (in particular in a modular manner) to a multiple laboratory device, for example a single magnetic stirrer to a multiple magnetic stirrer. The laboratory devices that can be coupled together in this way can, in particular, be designed in a simplified manner as similar laboratory devices which must be operated and controlled individually. For example, there is no need to provide a separate adjustment device for each of the laboratory devices that can be coupled together in order to adjust its operating parameters. Depending on the application, in addition to the common adjustment device, further operating or control elements, such as a display for the user, etc., can be provided centrally in a space-saving and effort-saving manner and omitted from individual laboratory devices that can be coupled together.

Thanks to the coupling device, the user of the laboratory device according to the invention also has the option of subsequently deciding whether, and if so, how many further laboratory devices are to be coupled to it. The coupling device can in particular be configured as a detachable coupling device, which can preferably be reused several times or as often as desired, in order to enable a modular structure which can be adapted at any time, in particular with regard to the number of further laboratory devices coupled thereto.

The central adjustment of the operating parameters can, in particular, enable simpler, faster and/or more reliable operation and/or control of the laboratory devices coupled together in this way than if the operation and the adjustment of operating parameters is separate for each of the laboratory devices used simultaneously. In particular in the case of a consistent (i.e. identical) setting of operating parameters for the coupled laboratory devices, there is no need to repeat the adjustment for each additional laboratory device, which can increase the comparability of the laboratory devices and the respective processes among each other and reduce the probability of any errors in the adjustment of operating parameters.

In a specific configuration, the common adjustment device represents a user interface integrated in the outer housing of the laboratory device according to the invention or in an outer housing of one of the further laboratory devices. Alternatively, the common adjustment device can represent a user interface or an automatic control interface provided in an external control unit, in particular a computer. In this as well as in any other configuration, the common adjustment device for adjusting the at least one operating parameter can preferably be configured in the choice of either uniformly or independently for the laboratory device according to the invention and the at least one further laboratory device, so that the user can decide between setting the same or individual operating parameters for the laboratory devices coupled together, depending on the application.

According to an embodiment, the coupling device comprises
- at least one mechanical coupling element for detachable and in particular rigid attachment of the at least one further laboratory device to the laboratory device according to the invention and/or
- at least one electrical coupling element for a detachable electrical connection of the laboratory device according to the invention with the at least one further laboratory device and/or for a detachable electrical connection of the laboratory device according to the invention with an external control unit, in each case for transferring the at least one operating parameter to the respective laboratory device, which operating parameter is set for the laboratory device according to the invention and/or for the at least one further laboratory device by means of the common adjustment device.

The mechanical coupling mentioned can provide a particularly space-saving and, particularly when rigidly attached, stable arrangement of the coupled laboratory devices which, for example, can further simplify the simultaneous operation of the laboratory devices and/or save space on a working surface of the user. In principle, any suitable mechanical or electrical coupling element can be used here, some specific examples being mentioned below purely by way of example. The electrical coupling element can in particular be additionally configured to supply power to the coupled further laboratory devices via the laboratory device according to the invention.

In a further development of the above embodiment, the at least one mechanical coupling element is integrally formed with the at least one electrical coupling element, in particular in the form of at least one mechanically fixing electrical plug-type connector. This can be particularly space-saving and/or contribute to the protection and stabilization of the electrical coupling element by the mechanical coupling element. For this purpose, the mechanical coupling element can in particular be configured to seal against liquids.

Alternatively or additionally, the mechanical coupling element and/or the electrical coupling element can comprise a guiding device for aligning the laboratory device according to the invention with the further laboratory device(s) to be coupled and/or a snap-in device or a clamping device for fixing the laboratory device according to the invention at the further laboratory device(s) to be coupled and/or can include two mechanical and/or electrical coupling elements arranged on opposite sides of the outer housing of the laboratory device according to the invention, each for coupling to one of the further laboratory devices. The guiding device or the snap-in or clamping device can prevent unwanted displacement of the coupled laboratory devices relative to one another or their unwanted detachment from one another. A particularly stable and/or space-saving arrangement of the coupled laboratory devices can be achievable with two mechanical or electrical coupling elements arranged on opposite sides of the outer housing, preferably arranged symmetrically or opposite with respect to one another.

Preferably, the laboratory device according to the invention further comprises a monitoring unit configured to detect a total number of laboratory devices coupled together by means of the coupling device of the laboratory device according to the invention and corresponding or complementary coupling devices of the at least one further laboratory device, and particularly preferably further configured to output a warning signal and/or to limit a power of the laboratory device according to the invention when a predetermined total number limit of the permissible total number of coupled laboratory devices is exceeded. In particular, the detected total number of coupled laboratory devices can also serve for device-internal control purposes and/or can be used internally when providing transmission of the operating parameters to the respective laboratory devices, which operating parameters are set by the common adjustment device. By monitoring the non-exceedance of a predetermined total number limit (for example four), overloading of individual components of the electrical power supply of the coupled laboratory devices can be prevented.

Alternatively or additionally, the laboratory device according to the invention preferably further comprises a user display arranged in the outer housing, which user display is configured to display the set at least one operating parameter for the laboratory device according to the invention and particularly preferably additionally for the further laboratory devices coupled to it and/or to display the total number of laboratory devices coupled together. Displaying the adjusted operating parameters on the laboratory device according to the invention can simplify or support their adjustment and/or control for the user. Displaying of the total number of laboratory devices coupled together can serve as an additional control by the user of the correct functioning of the entire system.

According to an embodiment, the laboratory device according to the invention and the at least one further laboratory device are designed as magnetic stirrers, each comprising a placement plate, in particular a heating plate, and a magnetic drive arranged inside the outer housing for generating a suitable magnetic field in order to set a stirrer in a vessel standing on the placement plate in a stirring motion. In this embodiment, the laboratory device functions which can be controlled by the at least one adjustable operating parameter comprise stirring and/or heating of a substance in a vessel standing on the placement plate.

In a further development of this embodiment, the coupling device of the laboratory device according to the invention is further configured for the mechanical and/or magnetic transmission of a drive energy to a magnetic drive of the at least one further laboratory device, which magnetic drive is configured to convert this drive energy into a magnetic field suitable for the stirring function, so that the at least one further laboratory device preferably does not require a drive energy of its own for generating the magnetic field suitable for its stirring function. This can in particular lead to a structural simplification of the further laboratory devices and, for example, reduce their size, weight and/or manufacturing costs.

Another aspect of the invention is a control unit for a laboratory device of the type described herein, the control unit being configured and/or programmed
- to recognize the at least one operating parameter, which operating parameter is set by means of the common adjustment device with regard to the laboratory device according to the invention, and to operate the laboratory device according to the invention in dependence thereon, and/or to recognize the at least one operating parameter, which operating parameter is set by means of the common adjustment device with regard to the laboratory device according to the invention and to the further laboratory devices coupled to it, and to operate the laboratory device according to the invention and the further laboratory devices coupled to it in dependence thereon and/or to detect a total number of laboratory devices coupled together by means of the coupling device of the laboratory device according to the invention and corresponding or complementary coupling devices of the at least one further laboratory device and preferably further to limit a power of the laboratory device according to the invention and/or output a warning signal when a predetermined total number limit of the permissible total number of laboratory devices coupled together is exceeded.

Such a control unit can be accommodated, for example, in the laboratory device according to the invention and/or in another or each of the laboratory devices coupled together. Alternatively or additionally, it can also be an external control unit which communicates, for example by means of the above-mentioned electrical coupling device(s), with the laboratory device according to the invention and in particular also with the further laboratory devices coupled to it. Detection of the adjustments of the operating parameters determined for the first laboratory device or for a specific one of the further laboratory devices connected to it and the control of these laboratory devices in dependence thereon makes it in particular possible to adjust the operating parameters centrally for all the laboratory devices coupled together.

According to a further aspect a set of laboratory devices is provided, the set comprising an inventive laboratory device of the type described herein, which represents a first laboratory device, and the above-mentioned further laboratory devices of the same type, which can be coupled to the first laboratory device by means of its coupling device, each of which further laboratory devices having an outer housing with a coupling device for coupling to the first laboratory device or to one another, which coupling device is configured such that the first and the at least one further laboratory device can be operated simultaneously by means of their coupling devices and the at least one operating parameter of the respective laboratory device can be adjusted in a central manner independently and/or consistently by means of a common adjustment device.

In this aspect, the coupling devices of the first and the further laboratory devices are designed correspondingly or complementarily among one another in such a way that the first and the further laboratory devices can each be coupled to one another by the cooperation of the respective coupling devices. In other words, for coupling two such laboratory devices, their coupling devices can be coupled to one another, which, for example, enables an optional modular connection of several laboratory devices of the set of laboratory devices.

What is said here in relation to the coupling device of the first laboratory device can apply analogously to the coupling devices of the further laboratory devices of the set of laboratory devices according to the invention. Preferably, the coupling devices of the first and of the further laboratory devices are designed uniform among each another, e.g. substantially the same.

In a specific configuration of a laboratory devices set of the type described herein, the first laboratory device represents a base laboratory device (also referred to as a master laboratory device or a high-end laboratory device), in the outer housing of which the common adjustment device in the form of a user interface is integrated. The at least one further laboratory device represents a number (one or more) of expansion laboratory devices (also referred to as slave laboratory devices or low-end laboratory devices) which are preferably substantially identical to one another and which can be modularly coupled to the base laboratory device by means of the respective coupling devices. In this embodiment, the coupling devices of the base laboratory device and of the expansion laboratory devices each comprise at least one electrical coupling element for a detachable electrical connection of the base laboratory device and the expansion laboratory devices to each other for transferring the at least one operating parameter to the expansion laboratory devices, which at least one operating parameter is set for the expansion laboratory devices on the user interface of the base laboratory device. Besides, in this configuration variant, what is said above and below to elucidate the invention with respect to the first laboratory device can in particular also apply analogously to an expansion laboratory device. The user interface can include any elements suitable for adjustment of operating parameters, e.g. control knobs, turning controllers, a touchscreen etc.

In an alternative configuration of the inventive set of laboratory devices, the first laboratory device and the at least one further laboratory device represent a number of modular and preferably mutually identical laboratory devices which can be coupled to one another as desired by means of the respective coupling devices. The respective at least one operating parameter of the modular laboratory devices can be adjusted centrally by means of a common adjustment device provided in an external control unit, in particular a computer. For this purpose, the coupling device of each modular laboratory device comprises at least one electrical coupling element for a detachable electrical connection of the modular laboratory devices to the external control unit and/or to one another for transferring the at least one operating parameter to the modular laboratory device, which operating parameter is set for the respective modular laboratory device by means of the common adjustment device.

By means of the modular configuration of laboratory devices for simultaneous operation and/or controlling several laboratory devices of the same type, as described herein, it is in particular possible to simplify the configuration of the expansion laboratory devices of the above first configuration variant or of the modular laboratory devices of the above second configuration variant of a set of laboratory devices according to the invention, as compared to laboratory devices operated individually. For example, it is possible to save costs and manufacturing space in the simplified laboratory devices by constructively relocating of functional above-mentioned elements, such as the adjustment device for operating parameters, the display or the drive, to a central device. Overall, this can economize on space on a work surface for a user. Control of all laboratory devices that can be coupled together can be configured uniformly, if necessary at least partially centrally, and thus particularly easy to understand, time-saving and/or straightforward. In particular, this makes it possible to save time when several identical processes are to take place, to increase their comparability and to prevent errors in the settings.

Another aspect of the invention is a retrofit kit for a laboratory devices set of the type described herein, the retrofit kit comprising one or several of the above-mentioned expansion laboratory devices or one or several of the above-mentioned modular laboratory devices. Thus, after purchasing a first laboratory device of the type described herein, the user has the possibility to also decide subsequently to purchase an expansion.

The above and further embodiments, specific configurations, features and expediencies of the invention are described in more detail below with reference to the examples shown in the accompanying drawings. The drawings are purely schematic, in particular they shall not be taken as being true to scale.

All of the various variants and specific configurational features of the laboratory device according to the invention, of the control unit, the set of laboratory devices and the retrofit kit of the type described here, which variants and features are mentioned further above in the description and in the subsequent claims, can be implemented in the examples shown in FIGS. 1 to 6. Therefore, they are not all repeated again below. The same applies to the definition of terms and the effects given above with regard to individual features shown in the figures.

Figure 1:
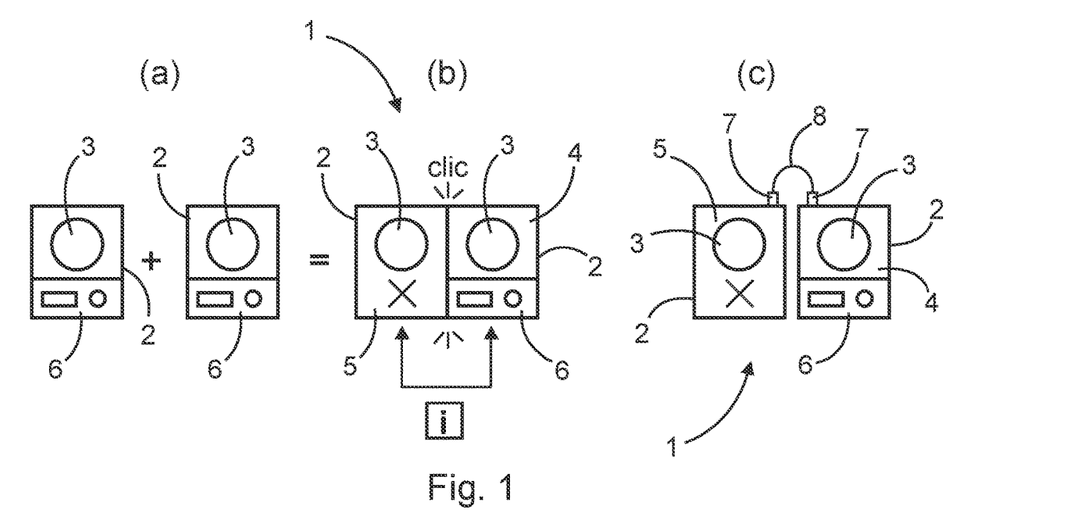
FIG. 1 shows a basic structure of a set of laboratory devices according to the present invention with a base laboratory device and at least one expansion laboratory device with different types of coupling devices.

FIG. 1 shows a schematic drawing of the basic structure of a set of laboratory devices 1 according to the invention. FIG. 1a) shows two conventional individual devices only for comparison, whereas FIGS. 1b) and 1c) each show a set of laboratory devices 1 according to the invention.

By way of example only, the laboratory devices shown in the figures are embodied as magnetic stirrers. Each of these magnetic stirrers comprises an outer housing 2, a heating plate 3 and a magnetic drive (not shown) arranged within the outer housing 2 for generating a suitable magnetic field in order to set a stirrer in a vessel (not shown) standing on the heating plate 3 in a stirring motion.

In FIG. 1b), the set of laboratory devices 1 comprises a first laboratory device of the type described herein as a base laboratory device 4 and at least one further laboratory device of the type described herein as an expansion laboratory device 5 (in the figure only one is shown for simplicity). The base laboratory device 4 and the expansion laboratory device 5 are similar in the above sense, because in this example they are both configured as magnetic stirrers with adjustable operating parameters, such as a temperature of the heating plate 3 or a stirring strength, for controlling their stirring and heating functions.

In contrast to the conventional individual devices shown in FIG. 1a), each of which requires a user interface 6 for setting its operating parameters, in the set of laboratory devices 1 of FIG. 1b) according to the invention only the base laboratory device 4 has a user interface 6 integrated in its outer housing 2, which serves as a common adjustment device of the type described herein, i.e. by means of which the operating parameters can be adjusted centrally both for the base laboratory device 4 and for the expansion laboratory device 5.

Therefore, no user interface 6 is required at the expansion laboratory device 5, which is indicated symbolically by a cross. In the present example, the user interface 6 mentioned can also include a user output device, for example in the form of a display, that is configured to display the operating parameters set for the base laboratory device 4 and the expansion laboratory device 5 and/or to display the total number of laboratory devices coupled together.

The base laboratory device 4 and the expansion laboratory device 5 are coupled to one another in FIG. 1b) by means of their coupling devices (not shown). The coupling devices of the base laboratory device 4 and the expansion laboratory device 5 each comprise at least one mechanical coupling element for mechanically attaching the outer housings 2 of the base laboratory device 4 and of the expansion laboratory device 5 to one another and at least one electrical coupling element for the electrical connection of the base laboratory device 4 and the expansion laboratory device 5 for transferring operating parameters to the expansion laboratory device 5 (indicated by a double arrow with an information symbol), which operating parameters are set for the expansion laboratory device 5 at the user interface 6 of the base laboratory device 4. In the example in FIG. 1b), the mechanical coupling elements also comprise a snap-in or clamping device (symbolically indicated by "Clic" and three lines at the connection locations of the two outer housings 2) for fixing the outer housings 2 of the base laboratory device 4 and the expansion laboratory device 5 to one another.

In FIG. 1c), the set of laboratory devices 1 according to the invention differs from that of FIG. 1b) only in the specific configuration of the coupling devices of the base laboratory device 4 and the expansion laboratory device 5. in FIG. 1c), the coupling devices are designed as electrical coupling elements in the form of electrical connections 6 integrated in the outer housings 2, for example as USB interfaces or suitable electrical plug-type connectors, which are electrically connected by a preferably short connecting cable 8.

Figure 2:
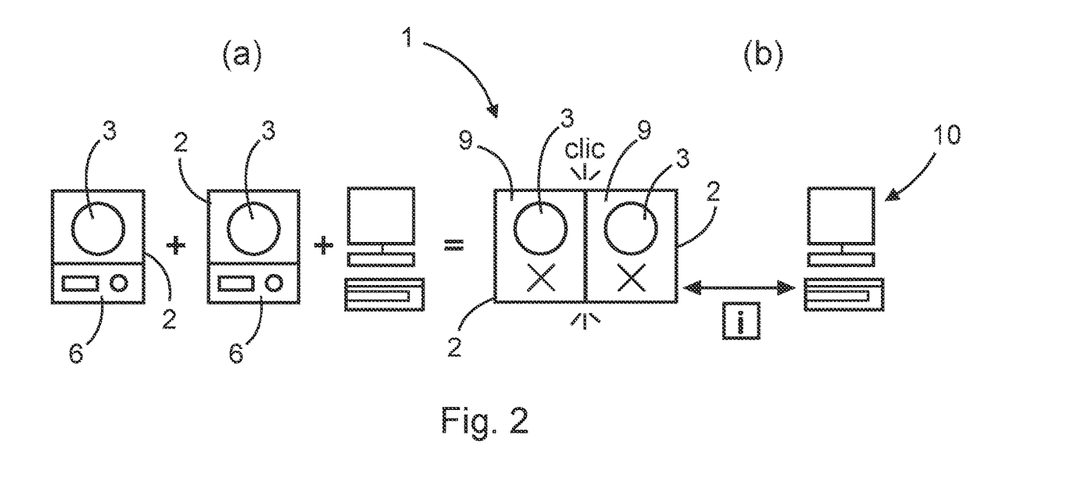
FIG. 2 shows a basic structure of a set of laboratory devices according to the present invention with several identical modular laboratory devices and an external control unit.

FIG. 2b) shows a basic structure of a set of laboratory devices 1 according to the invention as an alternative to FIG. 1b). Here, the set of laboratory devices 1 comprises several (in the figure only two for simplicity) preferably identical modular laboratory devices 9, each of which can represent a first laboratory device of the type described herein. As in FIG. 1a), FIG. 2a) shows two conventional individual devices only for comparison.

Contrary to FIG. 1b), in FIG. 2a) the operating parameters of the modular laboratory devices 9 can be adjusted centrally by means of a common adjustment device of the type described herein (such as a computer keyboard, etc.) provided in an external control unit 10, in particular a computer. For this purpose, the coupling device (not shown) of each modular laboratory device 9 comprises at least one electrical coupling element for the electrical connection of one or both modular laboratory devices 9 with the external control unit 10 (indicated by a double arrow with an information symbol) and/or to one another for transferring operating parameters to the respective modular laboratory device 9, which operating parameters are set for the respective modular laboratory device 9 by means of the common adjustment device in the external control unit 10. Therefore, the modular laboratory devices 9 require no user interface 6, as compared to the conventional individual devices of FIG. 2a), which is symbolically indicated in FIG. 2b) by a cross in the respective outer housing 2 of the modular laboratory devices 9. Otherwise, what has been described with respect to FIG. 2b) applies accordingly here.

Figure 3:
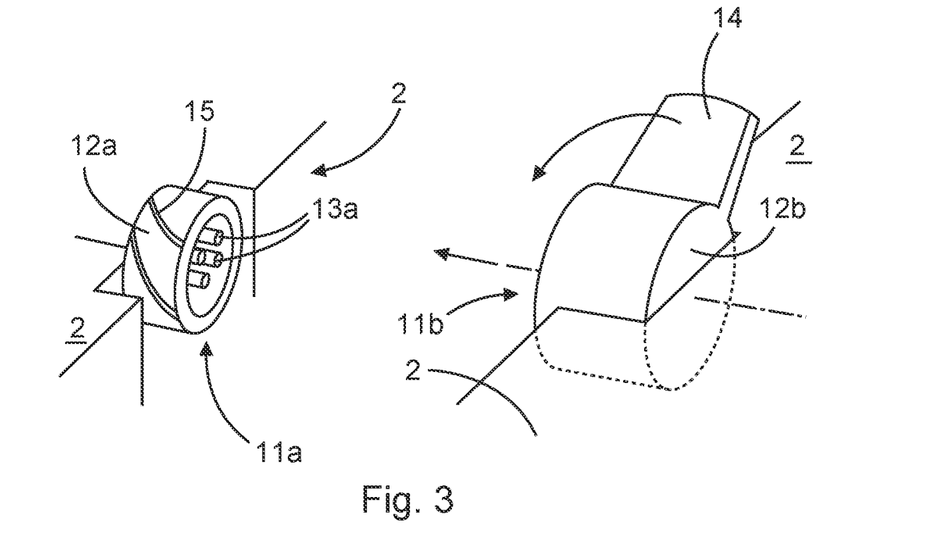
FIG. 3 shows a perspective view of an example of coupling devices on similar laboratory devices that can be coupled together in accordance with the present invention.

FIG. 3 shows a perspective view of an example of coupling devices 11a and 11b in outer housings 2 of two laboratory devices of the same type which can be coupled together, in accordance with the present invention. In particular, these can be the magnetic stirrers of FIGS. 1b), 1c), 2b) or of the subsequent FIGS. 5 and 6. The coupling devices 11a and 11b are configured complementary in such a way that the two outer housings 2 can be coupled to one another by the cooperation of the coupling devices 11a and 11b, in the example of FIG. 3 by their engagement.

In FIG. 3, the respective coupling device 11a or 11b represents a mechanically fixing electrical plug-type connector, in which a mechanical coupling element 12a or 12b is integrally formed with an electrical coupling element 13a or 13b (the latter being hidden from view in FIG. 3). The mechanical coupling element 12a/12b has the shape of engaging, preferably outwardly liquid-sealing sleeves, wherein the outer sleeve 12b is rotatable about the inner sleeve 12a by means of a turning handle 14 until the plug-type connector is in a locked state (indicated by a turning arrow). When rotating, the outer sleeve 12b is guided along an external thread 15 of the inner sleeve 12a. Altogether, this results in an aligning (guiding device) and fixing (snap-in or clamping device) function of the mechanical coupling elements 12a and 12b. Within their inside the electrical coupling element 13a and 13b is arranged in the form of adjoining electrical contacts.

Figure 4:
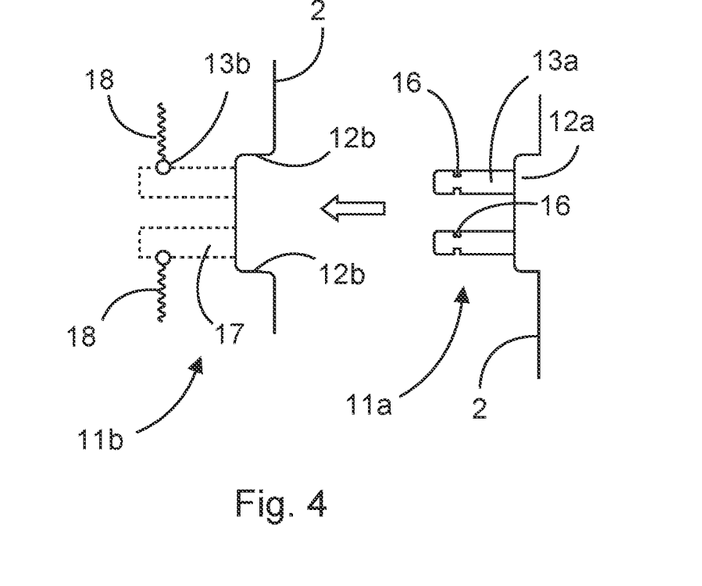
FIG. 4 shows a perspective view of a further example of coupling devices on similar laboratory devices that can be coupled together in accordance with the present invention.

FIG. 4 shows a perspective view of an alternative example to FIG. 3 of the coupling device 11a and 11b, also in the form of a mechanically fixing electrical plug-type connector, wherein elements with a similar or corresponding function as in FIG. 3 are denoted by the same reference numerals. In FIG. 4, the mechanical coupling element 12a of the laboratory device on the right in FIG. 4 is designed as a projection in its outer housing 2, which projection is designed for preferably liquid-sealed engagement in the mechanical coupling element 12b of the laboratory device on the left in FIG. 4, which is designed as a recess complementary thereto in the outer housing 2 of the left laboratory device. This results in an aligning (guiding device) function of the mechanical coupling elements 12a and 12b. The electrical coupling element 13a of the laboratory device on the right in FIG. 4 is designed as electrical plug contacts (purely by way of example, two are shown in FIG. 4) which extend from the projection of its outer housing 2 perpendicular to the outside and which are provided with lateral engagement notches 16 at their distal ends. When the mechanical coupling elements 12a and 12b engage, the, for example spherical, electrical contacts of the electrical coupling element 13b of the laboratory device on the left in FIG. 4, which are arranged in its outer housing 2 behind the recess 12b in side walls of channels 17 that are complementary to the plug contacts and are laterally pressed into the channels 17 by means of springs 18, are pressed into these engagement notches 16 (snap-in or clamping device).

Figure 5:
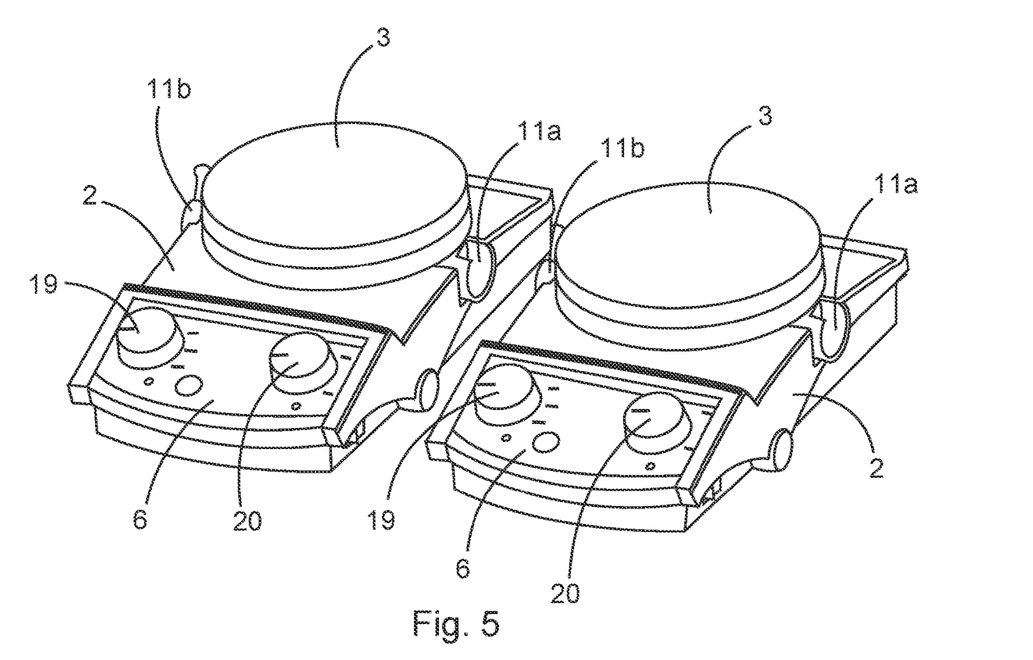
FIG. 5 shows a perspective view of two similar laboratory devices that can be coupled together in accordance with the present invention, shown in a non-coupled state
Figure 6:
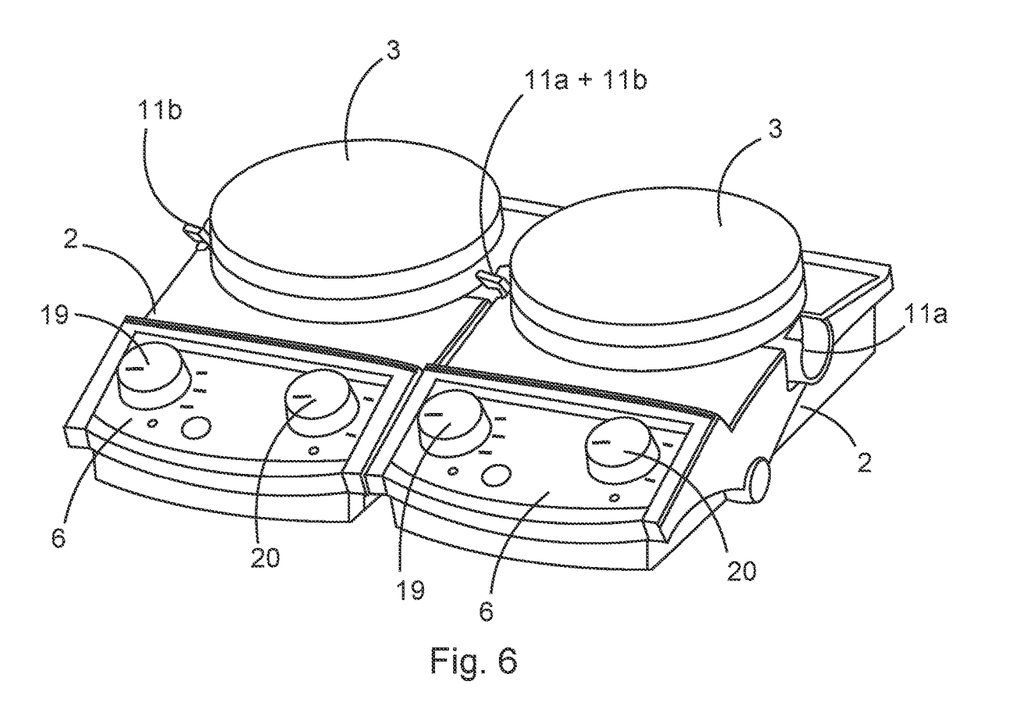
FIG. 6 shows the laboratory devices of FIG. 5 in a coupled state.

FIG. 5 shows a perspective view of two inventive laboratory devices of the same type that can be coupled together in a modular manner and which are shown in a non-coupled state, whereas FIG. 6 shows the laboratory devices of FIG. 5 in their coupled state. This can in particular be a laboratory device system 1 of FIG. 1b) or 2b), wherein the presence and configuration of the user interfaces 6 at one or both of the laboratory devices shown in FIGS. 5 and 6 is to be regarded as purely exemplary and not absolutely necessary in the FIGS. 5/6.

As also described with reference to FIGS. 1 and 2, the laboratory devices shown in FIG. 5/6 are designed as magnetic stirrers. Each one of these magnetic stirrers comprises an outer housing 2, a heating plate 3 and a magnetic drive (not shown) arranged within the outer housing 2 for generating a suitable magnetic field in order to set a stirrer in a vessel (not shown) standing on the heating plate 3 in a stirring motion. By means of the user interface 6 arranged on a front side of the outer housing 2, which user interface comprises two turning knobs 19 and 20 purely by way of example, operating parameters, such as a temperature of the heating plate 3 or a stirring strength, can be adjusted for controlling the stirring and heating function.

In FIG. 5/6, each laboratory device has two coupling devices 11a and 11b arranged on opposite sides of its outer housing 2, which coupling devices can be configured as in FIG. 3. In FIG. 6, the two laboratory devices are coupled to one another by the cooperation of their complementary coupling devices 11a (on the right side of the left laboratory device) and 11b (on the left side of the right laboratory device), as described in detail, for example, with reference to FIG. 3.

In addition or alternatively to the USB interfaces or electrical plug-type connections and cable connections mentioned herein purely by way of example, within the context of the invention, the suitable electrical coupling elements of the coupling devices can also include or embody devices for wireless communication.

The invention claimed is:

1. A laboratory device having at least one adjustable operating parameter for controlling at least one laboratory device function and having an outer housing, characterized in that the outer housing comprises a coupling device in the form of a mechanically fixing electrical plug-type connector for coupling the laboratory device to at least one further laboratory device for the same at least one laboratory device function, the at least one operating parameter of the further laboratory device being also adjustable, wherein the plug-type connector comprises a mechanical coupling element integrally formed with an electrical coupling element, wherein the coupling device is configured such that the laboratory device and the at least one further laboratory device can be operated simultaneously, and by a common adjustment device the at least one operating parameter can be adjusted in a central manner independently and/or consistently for the laboratory device and the at least one further laboratory device, and wherein the common adjustment device represents a user interface integrated in the outer housing of the laboratory device, and wherein the at least one further laboratory device is provided without a user interface.

2. The laboratory device of claim 1, wherein the common adjustment device is configured such that it selectively adjusts the at least one operating parameter consistently for the laboratory device and the at least one further laboratory device, or independently of one another.

3. The laboratory device of claim 1, wherein the at least one mechanical coupling element detachably attaches the at least one further laboratory device to the laboratory device.

4. The laboratory device of claim 3, wherein the at least one mechanical coupling element has a guiding device for aligning the laboratory device at the further laboratory device(s) to be coupled and/or has a snap-in or clamping device for fixing the laboratory device to the further laboratory device(s) to be coupled.

5. The laboratory device of claim 3, wherein the at least one mechanical coupling element comprises two mechanical coupling elements arranged on opposite sides of the outer housing, each for coupling to one of the further laboratory devices.

6. The laboratory device of claim 1, wherein the at least one electrical coupling element provides for a detachable electrical connection of the laboratory device to the at least one further laboratory device for transferring the at least one operating parameter to the respective laboratory device, which operating parameter is set for the laboratory device and/or for the at least one further laboratory device using the common adjustment device.

7. The laboratory device of claim 1, further comprising a user display arranged in the outer housing, which user display is configured to display the at least one operating parameter set for the laboratory device and/or for the further laboratory devices coupled to it, and/or to display the total number of laboratory devices coupled together.

8. The laboratory device of claim 1, wherein
the laboratory device and the at least one further laboratory device are designed as magnetic stirrers, each comprising a placement plate and a magnetic drive arranged inside the outer housing for generating a suitable magnetic field in order to set a stirrer in a vessel in a stirring motion, which vessel is standing on the placement plate, and
wherein the laboratory device functions controllable by the at least one adjustable operating parameter comprise stirring and/or heating of a substance in a vessel standing on the placement plate.

9. The laboratory device of claim 8, wherein the coupling device is further configured for the mechanical and/or magnetic transmission of a drive energy to a magnetic drive of the at least one further laboratory device, which magnetic drive is configured to convert this drive energy in a magnetic field suitable for the stirring function, such that the at least one further laboratory device does not require its own drive energy for generating the magnetic field suitable for its stirring function.

10. The laboratory device of claim 8, wherein the placement plate is a heating plate.

11. A control unit for a laboratory device of claim 1, wherein the control unit is configured and/or programmed
to recognize the at least one operating parameter that is set using the common adjustment device with regard to the laboratory device and to operate the laboratory device in dependence thereon.

12. The control unit of claim 11, wherein the control unit is further configured and/or programmed to detect a total number of laboratory devices coupled together by the coupling device of the laboratory device and corresponding or complementary coupling devices of the at least one further laboratory device and/or to limit a power of the laboratory device and/or to output a warning signal when a predetermined total number limit of the permissible total number of laboratory devices coupled together is exceeded.

13. The control unit of claim 11, wherein the control unit is configured and/or programmed to recognize the at least one operating parameter that is set by means of the common adjustment device with regard to the further laboratory devices coupled to the laboratory device and to operate the further laboratory devices in dependence thereon.

14. A set of laboratory devices, comprising
a laboratory device of claim 1, which represents a first laboratory device, and
the at least one further laboratory device, each of which has an outer housing with a coupling device for coupling to the first laboratory device or to one another, which coupling device is configured such that the first and the at least one further laboratory device can be operated simultaneously and the at least one operating parameter of the respective laboratory device can be adjusted in a central manner independently and/or consistently by a common adjustment device,
wherein the coupling devices of the first and the further laboratory devices are designed correspondingly or complementarily among one another in such a way that the first and the further laboratory devices each can be coupled to one another the cooperation of the respective coupling devices.

15. The set of laboratory devices of claim 14, wherein the coupling devices of the first and the further laboratory devices are designed uniformly among each other.

16. The set of laboratory devices of claim 14, wherein
the first laboratory device represents a base laboratory device, in the outer housing of which the common adjustment device in the form of a user interface is integrated, and
the at least one further laboratory device represents a number of expansion laboratory devices which can be modularly coupled to the base laboratory device using the respective coupling devices,
wherein the coupling devices of the base laboratory device and of the expansion laboratory devices each comprise at least one electrical coupling element for a detachable electrical connection of the base laboratory device and the expansion laboratory devices among each other for transferring the at least one operating parameter to the expansion laboratory devices, which operating parameter is set on the user interface of the base laboratory device for the expansion laboratory devices.

17. A retrofit kit for a set of laboratory devices according to claim 16, wherein the retrofit kit comprises one or several expansion laboratory devices of claim 16.

18. The set of laboratory devices of claim 16, wherein the expansion laboratory devices are mutually identical.

19. The laboratory device of claim 1, wherein the laboratory device is a magnetic stirrer.

20. The laboratory device of claim 1, wherein the at least one mechanical coupling element rigidly attaches the at least one further laboratory device to the laboratory device.

21. The laboratory device of claim 1, wherein the coupling device comprises at least one fixing electrical plug-type connector.

22. The laboratory device according to claim 1, further comprising a monitoring unit that detects a total number of laboratory devices coupled together by the coupling device of the laboratory device and corresponding or complementary coupling devices of the at least one further laboratory device, and the monitoring unit outputs a warning signal and/or limits a power of the first laboratory device when a predetermined total number limit of the permissible total number of laboratory devices coupled together is exceeded.

23. A laboratory device having at least one adjustable operating parameter for controlling at least one laboratory device function and having an outer housing, characterized in that
the outer housing comprises a coupling device for coupling the laboratory device to at least one further laboratory device for the same at least one laboratory device function, the at least one operating parameter of the further laboratory device being also adjustable,
and wherein the coupling device is configured such that by the coupling device the laboratory device and the at least one further laboratory device can be operated simultaneously and by a common adjustment device, and the at least one operating parameter can be adjusted in a central manner independently and/or consistently for the laboratory device and the at least one further laboratory device,
wherein the common adjustment device represents a user interface integrated in the outer housing of the laboratory device or in an outer housing of one of the further laboratory devices,
wherein the laboratory device functions comprise stirring of a substance in a vessel and wherein the coupling device is further configured for the mechanical and/or magnetic transmission of a drive energy to a magnetic drive of the at least one further laboratory device, which magnetic drive is configured to convert this drive energy in a magnetic field suitable for the stirring function.

24. The laboratory device according to claim 23, wherein the coupling device comprises at least one mechanical coupling element and at least one electrical coupling element.

25. The laboratory device according to claim 24, wherein the coupling device is a mechanically fixing electrical plug-type connector.

26. The laboratory device according to claim 25, wherein the plug-type connector comprises a mechanical coupling element integrally formed with an electrical coupling element.

27. The laboratory device according to claim 26, wherein the mechanical coupling element is a sleeve with a thread that engages a complementary sleeve of a further laboratory device, wherein engagement is effected by a rotating movement of the sleeve to achieve a locked state of the plug-type connector, and the electrical coupling element is at least one electrical contact provided within the sleeve.

28. A laboratory device having at least one adjustable operating parameter for controlling at least one laboratory device function and having an outer housing, characterized in that
the outer housing comprises a coupling device in the form of a mechanically fixing electrical plug-type connector for coupling the laboratory device to at least one further laboratory device for the same at least one laboratory device function, the at least one operating parameter of the further laboratory device being also adjustable,
wherein the plug-type connector comprises a mechanical coupling element integrally formed with an electrical coupling element,
the mechanical coupling element being a sleeve with a thread that engages a complementary sleeve of a further laboratory device, wherein engagement is effected by a rotating movement of the sleeve to achieve a locked state of the plug-type connector, and
the electrical coupling element being at least one electrical contact provided within the sleeve,
and wherein the coupling device is configured such that the laboratory device and the at least one further laboratory device can be operated simultaneously and the at least one operating parameter can be adjusted in a central manner independently and/or consistently for the laboratory device and the at least one further laboratory device using a common adjustment device, wherein the common adjustment device is an external control unit, and wherein the laboratory devices are provided without a user interface.

* * * * *